US011267650B2

(12) United States Patent
Godwin et al.

(10) Patent No.: US 11,267,650 B2
(45) Date of Patent: Mar. 8, 2022

(54) PACKAGE RECEIVING AND DELIVERY SYSTEM

(71) Applicant: Box Bot Inc., Oakland, CA (US)

(72) Inventors: Mark Godwin, El Cerrito, CA (US); Austin Oehlerking, Oakland, CA (US); John McDonald, Oakland, CA (US); Jordan Gatti, San Francisco, CA (US)

(73) Assignee: BOX BOT, INC., Oakland, CA (US)

( * ) Notice: Subject to any disclaimer, the term of this patent is extended or adjusted under 35 U.S.C. 154(b) by 0 days.

(21) Appl. No.: 16/896,088

(22) Filed: Jun. 8, 2020

(65) Prior Publication Data

US 2020/0385207 A1 Dec. 10, 2020

Related U.S. Application Data

(60) Provisional application No. 62/857,823, filed on Jun. 6, 2019.

(51) Int. Cl.
*B65G 1/04* (2006.01)
*B60P 1/64* (2006.01)
*B60P 3/00* (2006.01)
*B60P 1/54* (2006.01)

(52) U.S. Cl.
CPC .......... *B65G 1/0492* (2013.01); *B60P 1/6481* (2013.01); *B60P 3/007* (2013.01); *B60P 1/5423* (2013.01)

(58) Field of Classification Search
CPC ..... B60P 1/6409; B60P 1/6436; B60P 1/5423; B60P 1/6481; B60P 3/007; B65G 1/0492; G01C 21/165; G01C 21/1652
See application file for complete search history.

(56) References Cited

U.S. PATENT DOCUMENTS

| | | | |
|---|---|---|---|
| 6,325,586 B1 | 12/2001 | Loy | |
| 2005/0047895 A1 | 3/2005 | Lert, Jr. | |
| 2010/0300041 A1 | 12/2010 | Kim | |
| 2012/0031686 A1* | 2/2012 | Ferrigni | B60P 3/20 180/2.2 |
| 2015/0239389 A1* | 8/2015 | Konchan | B60P 1/6436 414/495 |
| 2016/0090248 A1 | 3/2016 | Worsley et al. | |
| 2016/0221768 A1 | 8/2016 | Kadaba et al. | |
| 2017/0030722 A1* | 2/2017 | Kojo | G01S 19/47 |

(Continued)

OTHER PUBLICATIONS

International Search Report issued in PCT/US18/059119 (dated Nov. 3, 2017).

*Primary Examiner* — Kaitlin S Joerger
(74) *Attorney, Agent, or Firm* — Brad Bertoglio; Intelink Law Group, P.C.

(57) ABSTRACT

A system for parcel delivery may be provided using a package Pickup and Receiving Stations (PRS), sometimes also referred to as a Hub or Local Automated Hub. In some applications, it may be desirable to provide a number of PRSs located in areas having a high volume of local package delivery. Parcels directed to a recipient within an area serviced by the PRS may be delivered in bulk to the PRS by a parcel carrier. The PRS may then attend to final delivery to each parcel's recipient, preferably using an automated ground vehicle (AGV). Additionally or alternatively, consumers may tender packages to an AGV for, e.g., subsequent retrieval by a package carrier for further transport.

8 Claims, 12 Drawing Sheets

(56) References Cited

U.S. PATENT DOCUMENTS

| | | | | |
|---|---|---|---|---|
| 2017/0357919 A1* | 12/2017 | Bischoff | ............... | G06Q 50/32 |
| 2019/0143872 A1* | 5/2019 | Gil | ........................ | A47F 5/08 |
| | | | | 211/86.01 |
| 2019/0278274 A1* | 9/2019 | Igata | .................. | G05D 1/0212 |
| 2019/0351802 A1* | 11/2019 | Cole | ...................... | B60J 5/047 |
| 2020/0209865 A1* | 7/2020 | Jarvis | .................. | G01C 21/20 |
| 2020/0223347 A1* | 7/2020 | Hara | .................. | B62D 33/042 |
| 2020/0247302 A1* | 8/2020 | Buttolo | ................ | B60J 5/0491 |
| 2020/0346572 A1* | 11/2020 | Merta | ................... | B60P 1/649 |

\* cited by examiner

PACKAGE RECEIVING AND DELIVERY SYSTEM

TECHNICAL FIELD

The present disclosure relates in general to an autonomous ground vehicle (AGV) to pick up, deliver and securely store parcels for the parcel delivery industry.

BACKGROUND

With the continued growth of Internet-based commerce, parcel delivery has become an increasingly prevalent means of conveying goods to businesses and individuals alike. However, growing parcel volumes present challenges for parcel transporters. Shippers become increasingly reliant on parcel shipping as a mode of product distribution. Parcel recipients may have to deal with increasing parcel volume, as well as increased instances of returning parcels via return shipment. Meanwhile, "last mile" delivery logistics are commonly understood to represent a significant portion of the cost and burden of parcel transport.

Various approaches have been attempted for improving the logistics of parcel delivery. For example, Amazon™ has introduced a locker service via which parcels may be delivered to a secure locker at a fixed site in the vicinity of the parcel recipient's address. The parcel recipient may then visit the locker site at the recipient's convenience, to enter a pickup code, or scan a bar code, in order to obtain access to a locker containing the recipient's parcel. However, such an approach requires the parcel recipient to travel to a locker site, which may be unavailable or inconvenient for many parcel recipients.

For these and other reasons, parcel shippers, carriers and recipients alike may benefit greatly from opportunities to reduce the cost of delivery, increase the speed and efficiency of delivery, and/or provide parcel shipping participants with greater convenience and flexibility. Applicant's co-pending U.S. patent application Ser. No. 16/758,387, filed Apr. 22, 2020, based on International Patent Application PCT/US2018/0599119, filed Nov. 5, 2018 (the contents of which are both hereby incorporated by reference in their entirety), describes several systems and methods for improving and automating portions of the parcel delivery process. Further variations and improvements are described further herein.

SUMMARY

In accordance with some embodiments, an autonomous ground vehicle is provided for transporting parcels, which may be automatically loaded into the vehicle. Aspects described include the structure of an AGV and environments in which it operates, as well as methods for loading and operating an AGV. The AGV includes first and second package areas (e.g. left and right side package areas), each providing multiple parcel receptacle areas. Each package area may include externally-exposed doors, enabling access to the package area's parcel receptacles by, e.g., a parcel recipient. A central channel may be provided between the first and second package areas. Each of the package areas may be accessible from the central channel, e.g. for automated loading of the parcel receptacle areas. In some embodiments, the two package areas may be movable, sliding outwards from the vehicle centerline to facilitate loading through the central channel, and sliding back together towards the vehicle centerline to facilitate vehicle navigation (e.g. with a reduced vehicle width relative to the loading configuration). The vehicle may be loaded in an automated manner by, e.g., a 2D gantry extending into the central channel for insertion of parcels into the parcel receptacles. The vehicle may be reversed towards a fixed-location 2D gantry system in order to facilitate interposing the 2D gantry into the central channel and then loading of parcels into the vehicle by the 2D gantry with associated end of arm tool. The vehicle may then be moved in a forward direction to remove the 2D gantry from the central channel.

In some embodiments, the AGV may include a passenger compartment; in others, no passenger compartment may be provided. Optionally, the AGV may be equipped with a system for autonomous navigation of a delivery area.

The AGV may include one or more user terminals (e.g. one of each side), providing a user interface for delivery recipients to request access to their parcels. Entry, e.g., of an access code or other recipient authentication mechanism, may trigger opening of an external door to enable access to a parcel receptacle area within which the recipient's parcel resides. In some embodiments, larger parcels may be stored within multiple contiguous parcel receptacles; during access by a parcel recipient, multiple contiguous external doors may be opened and closed to enable access to the larger parcel.

The AGV may include an access door for automated loading and/or unloading of the AGV. In some embodiments, the access door may extend long rear and top surfaces of the AGV, further facilitating access to the central channel by a 2D gantry.

The AGV may include multiple LIDAR sensors to facilitate autonomous navigation. Preferably, at least one LIDAR sensor will be positioned each of four vehicle corners: an upper front left corner, and upper front right corner, an upper rear left corner, and an upper rear right corner. The LIDAR sensors may be angled downwards relative to a horizontal plane, e.g. by an angle in the range of 10 to 30 degrees, such as 12.5 degrees.

In accordance with other aspects of the invention, a two-sided AGV may efficiently delivery parcels to locations on either side of a roadway, in accordance with methods benefitting from the two-sided configuration of the AGV. A route may be determined for the AGV, assuming that the AGV is loaded and equipped such that it may pull over for delivery to either side of a one-way road, or a two-way road that lacks a center median or other traffic condition prohibiting crossing over of a roadway centerline. The AGV may then be loaded with parcels towards the delivery destination side, as viewed from the direction of travel.

These and other aspects of the embodiments will become evident in view of the description and drawings set forth herein.

DETAILED DESCRIPTION

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

A system for parcel delivery may be provided using a package Pickup and Receiving Stations (PRS), sometimes also referred to as a Hub or Local Automated Hub. In some applications, it may be desirable to provide a number of PRSs located in areas having a high volume of local package delivery. Parcels directed to a recipient within an area serviced by the PRS may be delivered in bulk to the PRS by a parcel carrier. The PRS may then attend to final delivery to each parcel's recipient, preferably using an autonomous ground vehicle (AGV). Additionally or alternatively, consumers may tender packages to an AGV for, e.g., subsequent retrieval by a package carrier for further transport.

While certain embodiments and illustrations described herein refer to handling and delivery of parcels and/or packages (which terms may be used interchangeably), it is contemplated and understood that various embodiments and inventions described herein may be beneficially utilized in connection with a wide variety of items, particularly items that may be placed in standardized trays or containers for handling. Examples include, without limitation: mail, parcels, packages, prepared foods, groceries, or other items that may be placed in trays or containers. Systems and methods referenced herein as handling parcels or packages should not be deemed limited to handling of such items traditionally referred to as parcels or packages, unless exclusion of other item types is expressly stated or inherent given the nature of the described method or apparatus.

AGV with Double-Sided Package Compartment

In some circumstances, it may be desirable for the AGV to have capabilities to autonomously navigate on public roads. Such an implementation may greatly extend the geographical area that may be serviced by a given PRS and AGV, while also avoiding many physical constraints that may be imposed on smaller AGV embodiments, such as a lack of contiguous and unobstructed sidewalk access. However, road-going AGVs may require significantly more sophisticated and costly drivetrains and control systems.

In order to maintain cost and operational efficiency, it may be highly desirable to increase the package handling capacity of the AGV. One approach to doing so may include providing a double-sided AGV, with package compartments opening on both the left and right sides of the vehicle. However, automated loading of such a dual-sided AGV may be challenging or increase system costs. If parcels are loaded through the external (i.e. externally-exposed) side doors, two loading mechanisms may be required (i.e. one on each side of the vehicle) or the vehicle may be forced to reposition itself to load each side (increasing loading time). Additionally, it may be difficult or impossible to simultaneously optimize a package compartment interface for both human access (e.g. customer loading or unloading of packages into or out of the AGV), as well as automated or robotic access (e.g. loading or unloading the AGV by a robotic or automated system).

Figure 1:
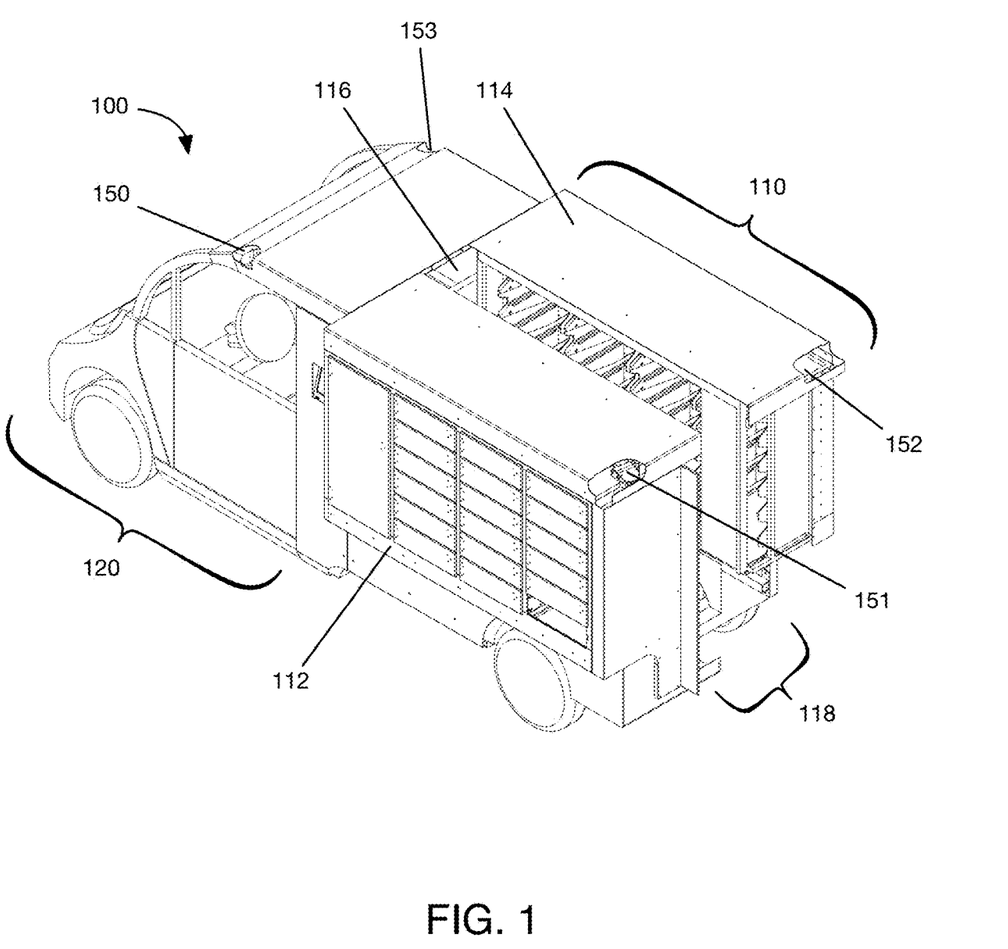
FIG. 1 is a perspective view of an AGV with split parcel storage area for center loading.

FIG. 1 is an upper left perspective view of an embodiment of an AGV 100 that may address some or all of these challenges. AGV 100 implements a split design so as to provide significantly greater package capacity, an ability to service package recipients on either side of the AGV, and separate interfaces for human access (e.g. externally-facing access doors) and robotic access (e.g. an internal loading channel enabling full utilization of a PRS gantry and end of arm tool)—all while still maintaining a compact operational footprint and versatile tray handling capabilities. Such concepts may be implemented similarly whether the vehicle expands during loading to allow access between storage locker areas (as in AGV 100), or whether the AGV is wide enough to provide a center package loading channel between stationary locker systems (as illustrated further hereinbelow).

AGV 100 includes package compartment 110, consisting of a left package area 112 and a right package area 114. AGV 100 is also illustrated having a passenger compartment 120, which may be provided to enable human control of AGV 100 in circumstances where autonomous navigation is not permitted or undesirable, or in the event of technical failure of an autonomous navigation system. However, it is contemplated and understood that in some embodiments, such as those in which exclusively autonomous AGV operation is preferred, passenger compartment 120 may be omitted.

Figure 2:
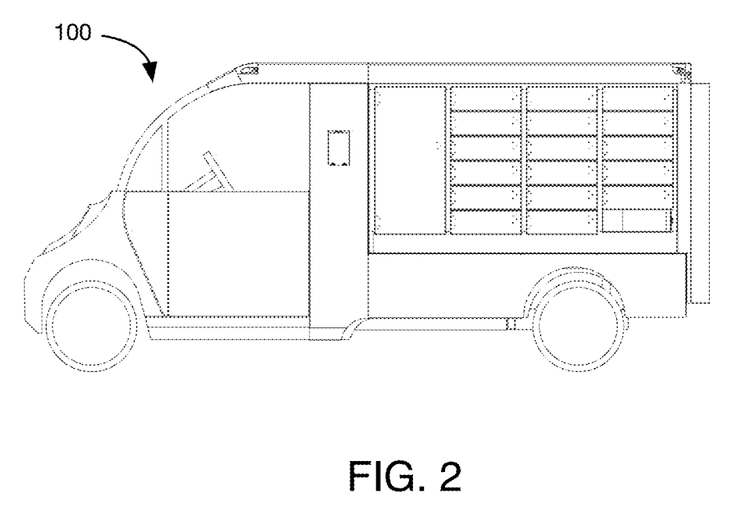
FIG. 2 is a side elevation of the AGV of FIG. 1.
Figure 3:
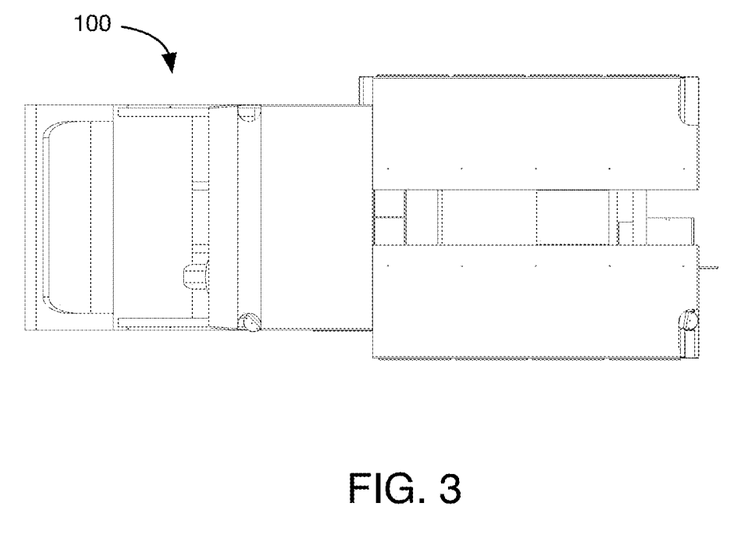
FIG. 3 is a top plan view of the AGV of FIG. 1.

In order to maximize efficiency of AGV loading by a PRS, package compartment 110 of AGV 100 includes a sliding, split design. In particular, during loading and unloading of AGV 100 within a PRS, left package area 112 and right package area 114 may each be extended laterally outward, away from a centerline 116 of package compartment 110, into a loading position to enable access to an internal side of each package area via central loading channel 118. FIG. 2 shows a left side elevation of AGV 100 in a loading position. FIG. 3 is a top plan view of AGV 100 with left package area 112 and right package area 114 each in a loading position.

Figure 4:
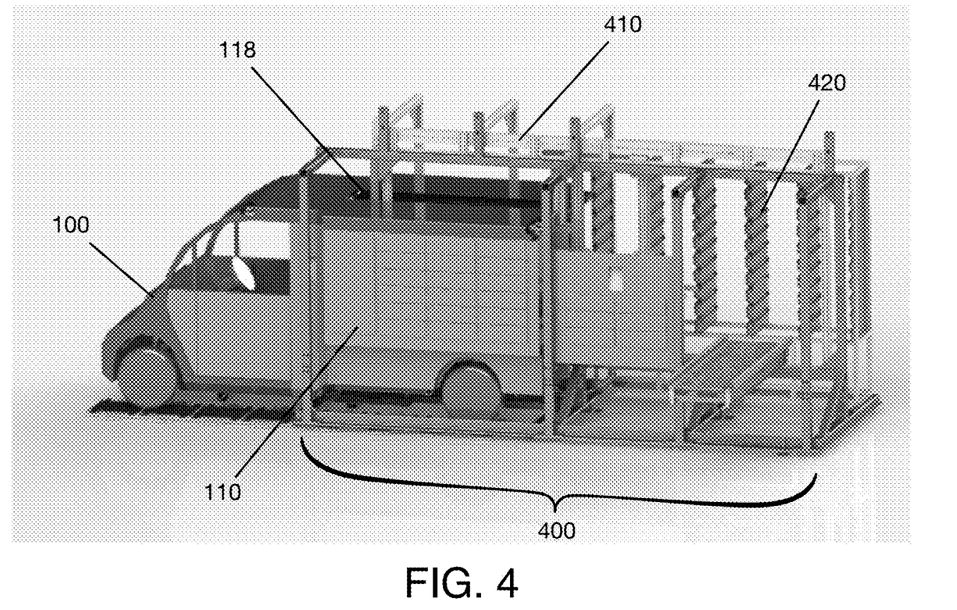
FIG. 4 is a perspective view of an AGV with split parcel storage area engaged with a 2D gantry and end of arm tool for loading or unloading.

By providing such a split package compartment area, both sides 112 and 114 of AGV 100 may be loaded and unloaded in an automated or autonomous manner, by a single 2D gantry with end of arm tool, interposed into central loading channel 118. FIG. 4 illustrates such an operation from an upper side perspective view. Package compartment 110 of AGV 100 is in an open configuration. 2D gantry 410 is positioned longitudinally along a centerline of loading bay 400. AGV 100 is shown after having reversed into loading bay 400, with 2D gantry 410 extending into AGV central channel 118. An end of arm tool (not shown) may move along 2D gantry 410, moving parcel trays containing parcels between PRS shelving 420 and shelving internal to AGV parcel area 110.

Figure 5:
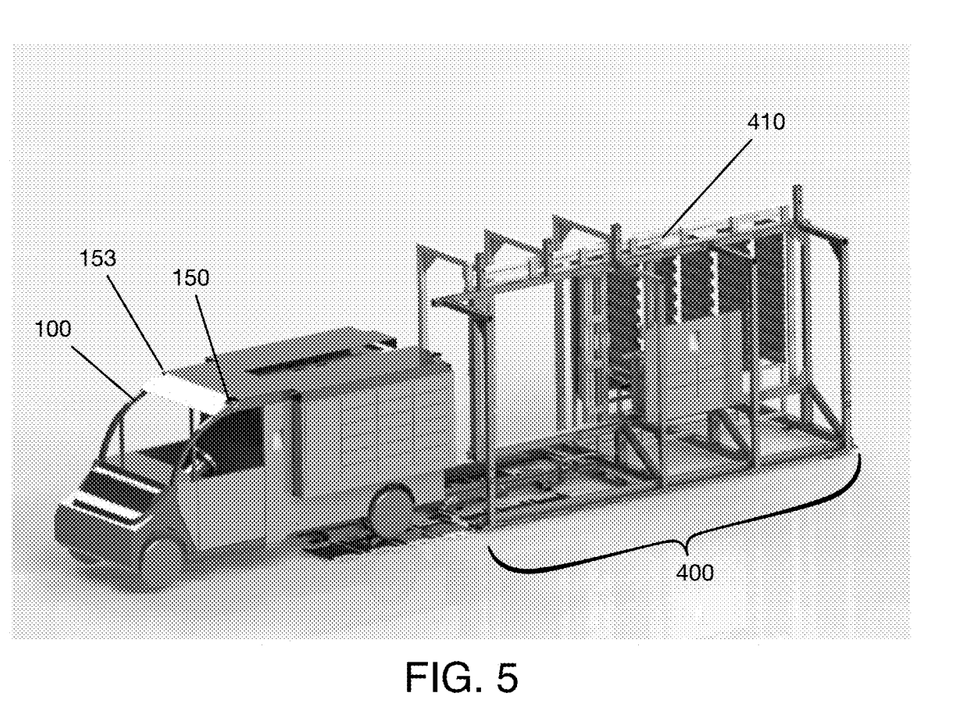
FIG. 5 is a perspective view of an AGV with split parcel storage area having disengaged from a loading mechanism.

Once AGV 100 is loaded or unloaded, AGV 100 may drive out of loading bay 400, as illustrated in FIG. 5

Figure 6:
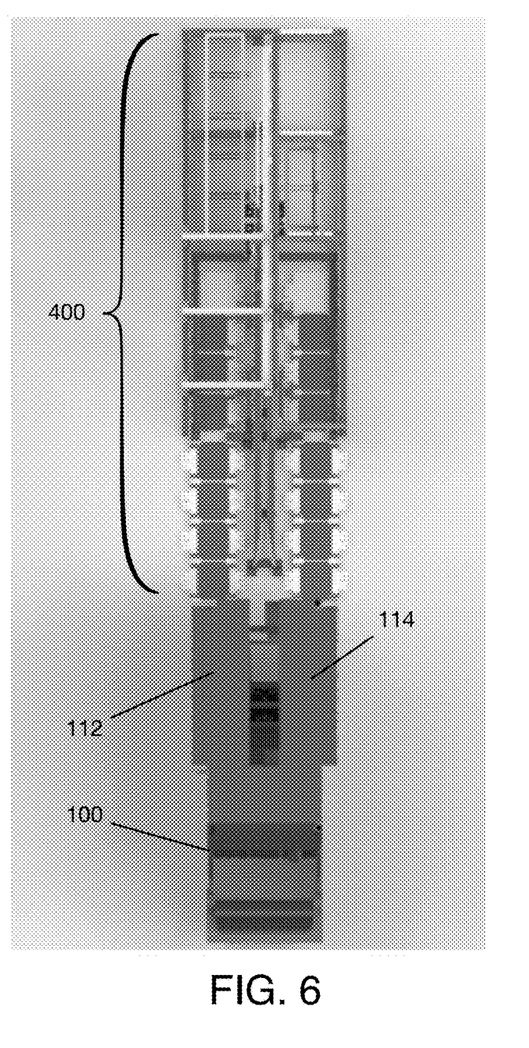
FIG. 6 is a top plan view of the AGV arrangement of FIG. 5.
Figure 7:
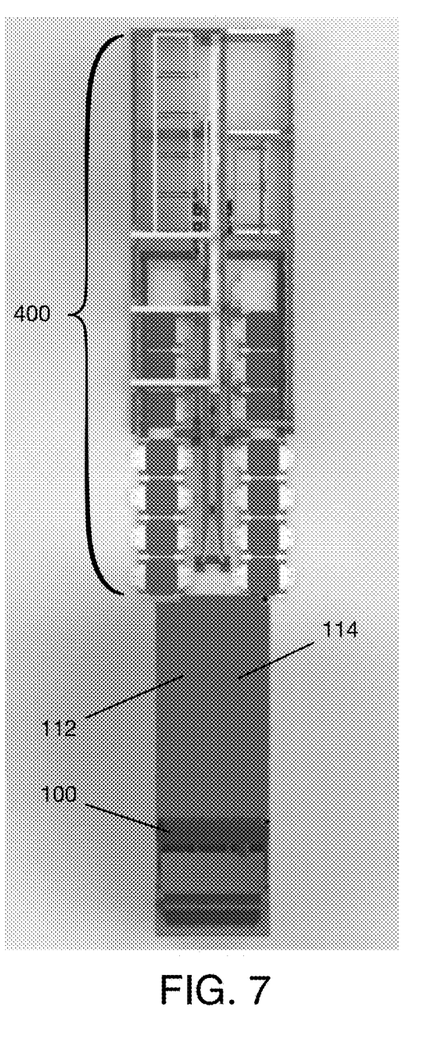
FIG. 7 is a top plan view of the AGV arrangement of FIG. 5, with split parcel storage areas in a closed configuration.

(perspective view) and FIG. 6 (top plan view). At this point, package compartment sides 112 and 114 may be moved inwards, towards centerline 116, into a navigation position, to close center loading channel 118, thereby reducing the overall width of AGV 100 and potentially facilitating road-going navigation. FIG. 7 illustrates AGV 100 with package areas 112 and 114 having been moved inwards into a navigation position for transit outside of the PRS.

While the movable split package compartment illustrated in the embodiments of FIGS. 1-7 may be useful in maximizing space efficiency during transit, movable package compartment sides 112 and 114 may also introduce opportunities for mechanical malfunction, and/or increase maintenance requirements. Meanwhile, humans approaching an AGV to unload a package have a limited distance over which they may comfortably reach into an AGV to retrieve a package. For example, a typical road going passenger vehicle may be roughly 66 inches wide. However, a typical adult human may only be able to comfortably reach up to 24 inches into a package compartment to retrieve a package. Therefore, even if an AGV package compartment is double-sided, in some embodiments, a center portion of the vehicle may not be easily accessible by humans anyways. Therefore, a double-side AGV may, in other embodiments, be provided with a fixed-width, open center channel for parcel loading and unloading.

Figure 8:
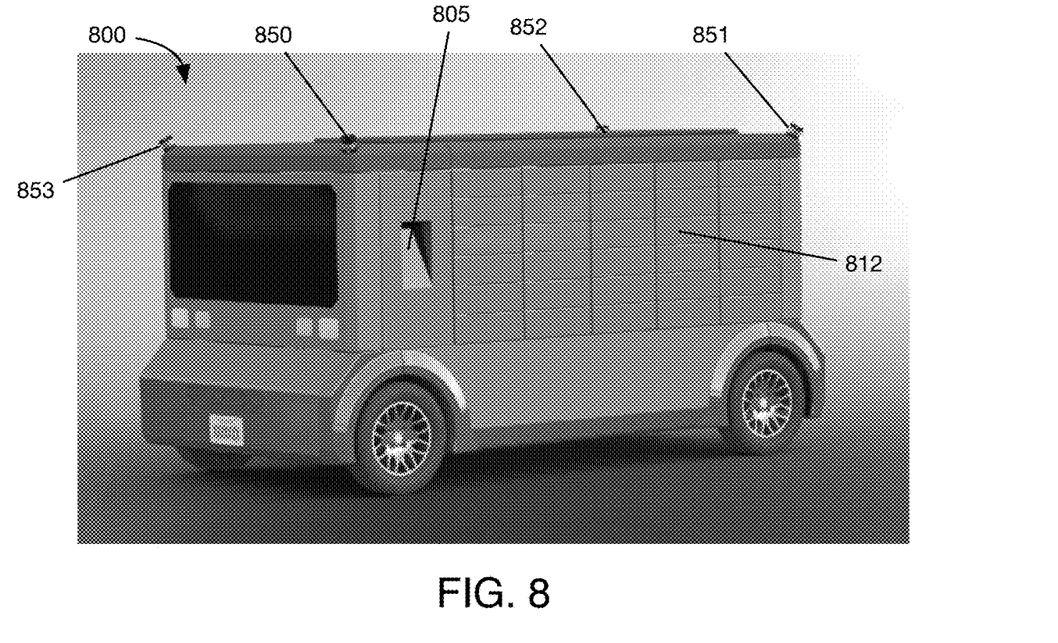
FIG. 8 is a front perspective view of an AGV, in accordance with another embodiment.
Figure 9:
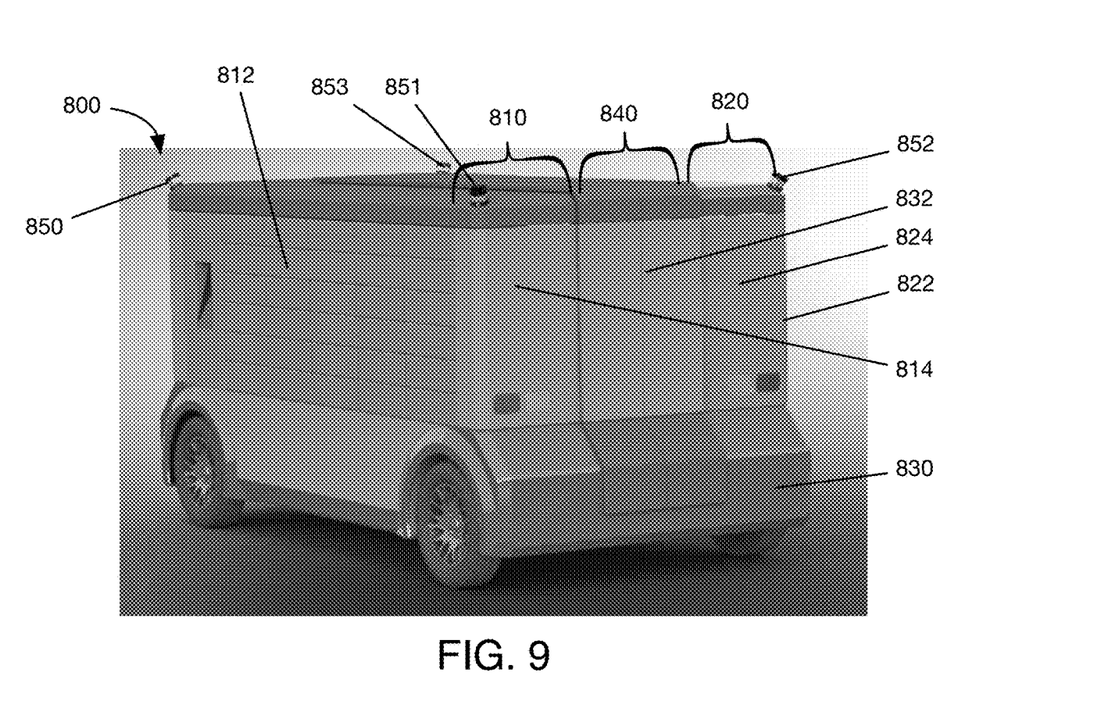
FIG. 9 is a rear perspective view of the AGV of FIG. 8.

FIG. 8 illustrates such an embodiment, with fixed-position package areas, from a front left side perspective view; FIG. 9 illustrates a rear left side perspective view. AGV 800 is generally cuboid in shape, and externally symmetrical across a longitudinal centerline (i.e. the left and right sides of the AGV are generally similar in structure and appearance externally). User terminal 805 may be exposed on an external surface of the AGV to allow user interaction with AGV 800 from a left side of the AGV (e.g. by entry of an access code for parcel retrieval); a similar terminal may be provided on a right side of AGV 800 in order to facilitate user interaction from the other side of the AGV. Left side portion 810 also includes a plurality of externally-exposed doors 812 enclosing and securing access to various portions of a left side package receptacle area 814. Similarly, right side portion 820 includes a plurality of externally-exposed doors 822 (not visible, but generally symmetric with doors 812) enclosing and securing access to various portions of a right side package receptacle area 824. Preferably, doors 812 and 822 are electronically locking and electronically actuated for both automated opening and automated closing, thereby enabling AGV 800 to automatically open one or more doors 812 and/or 822 to provide an individual proximate AGV 800 with access to packages stored within package receptacle area 814 and/or 824, respectively.

Rear side 830 of AGV 800 includes an access door 832, which is preferably electronically locking and electronically actuated for opening and closing by AGV 800. Access door 832 may be opened to provide access to central channel 840, via which parcels may be loaded into, or unloaded from, AGV 800. Preferably access door 832 further extends onto a top surface of AGV 800, such that center channel 840 may be open to the back side and top side of AGV 800 during loading, enabling a 2D gantry mechanism to extend above AGV 800 as illustrated in FIGS. 4 and 5.

In some embodiments, package receptacle areas 814 and 824 may utilize a shelf-based storage system as further detailed in Applicant's co-pending International Patent Application PCT/US2018/0599119, the contents of which are hereby incorporated by reference in their entirety. Thus, doors 812 and 822 provide an interface to parcel receptacle areas 814 and 824 that is optimized for human interaction, while portions of parcel receptacle areas 814 and 824 facing inwards towards central channel 840 may be optimized for automated or machine-based interactions. In some embodiments, multiple vertically-contiguous doors 812 or 822 may be opened simultaneously to provide access to a larger parcel storage area portion for retrieval of larger packages, as also described in Applicant's above-referenced co-pending application.

In operation, for loading or unloading, after opening of access door 832, AGV 800 may be reversed into a PRS, with a 2D gantry installed in a fixed position within the PRD. The 2D gantry and end of arm tool may then move in and out of central channel 840 to load and/or unload containerized parcels (e.g. standardized shelves with parcels loaded onto them) into parcel receptacle areas 814 and 824.

LIDAR Configuration

Preferably, AGVs will be capable of autonomous driving. In some embodiments, it may be desirable to utilize LIDAR sensors to facilitate local environment sensing, vehicle localization, and autonomous navigation throughout a package delivery environment. Conventionally, a spinning LIDAR sensor with 360 degree horizontal field of view may be centrally mounted above a vehicle for sensing of a vehicle's local environment in all directions. However, such configurations may be non-optimal for package delivery AGVs. For example, in order to maximize parcel carrying capacity for a given vehicular footprint, the AGV may be relatively boxy in shape, with high flat sides extending towards the front and rear of the AGV, as is the case with AGV 800 illustrated in FIGS. 8 and 9. (Aerodynamic considerations may be less important, to the extent that the AGV is primarily used for "last mile" parcel deliveries, traveling at slow speeds with many stops in urban or neighborhood environments.) Since LIDAR sensors operate on a line-of-sight basis, even if unconstrained by the LIDAR's inherent maximum vertical field of view, a centrally-mounted LIDAR would have to be mounted at a very elevated height above the AGV in order to provide sensing at close distances to the AGV. A very high LIDAR installation would limit a vehicle's freedom to operate, for example, when entering and exiting garages, or passing under low trees or structures. Restrictions imposed by added LIDAR installation height may be particularly significant on larger vehicles, such as those illustrated in FIGS. 16A-C.

Thus, alternative LIDAR configurations may be particularly beneficial for AGVs having a boxy shape. One such example is illustrated in FIGS. 8 and 9, in connection with AGV 800; another embodiment is illustrated in connection with AGV 1600 in FIGS. 16A-C. Four LIDAR sensors 850, 851, 852 and 853 are mounted at or close to the four upper corners of AGV 800 (i.e. the front upper left corner; the rear upper left corner; the rear upper right corner; and the front upper right corner, respectively). Each LIDAR sensor 850-853 may then be angled downwards for improved close-in sensing in an area proximate the vehicle where the sensor is mounted. Meanwhile, each LIDAR sensor 850-853, when sensing components are directed towards the vehicle center, may observe objects and environmental constituents above AGV 800, enabling effective sensing of street lights, trees, underpass ceiling areas, other possible overhead obstructions, or sides of buildings. Meanwhile, LIDAR sensors 850-853 may be positioned with overlapping fields of view, further providing redundancy in the event of sensor failure, or multiple perspectives in the event a close-in object obstructs a view from one of the LIDAR sensors.

Other AGV form factors may also benefit from a four-corner LIDAR configuration. For example, AGV 100 (FIGS. 1-6) may be equipped with LIDARs 150, 151, 152 and 153, as illustrated.

Figure 10:
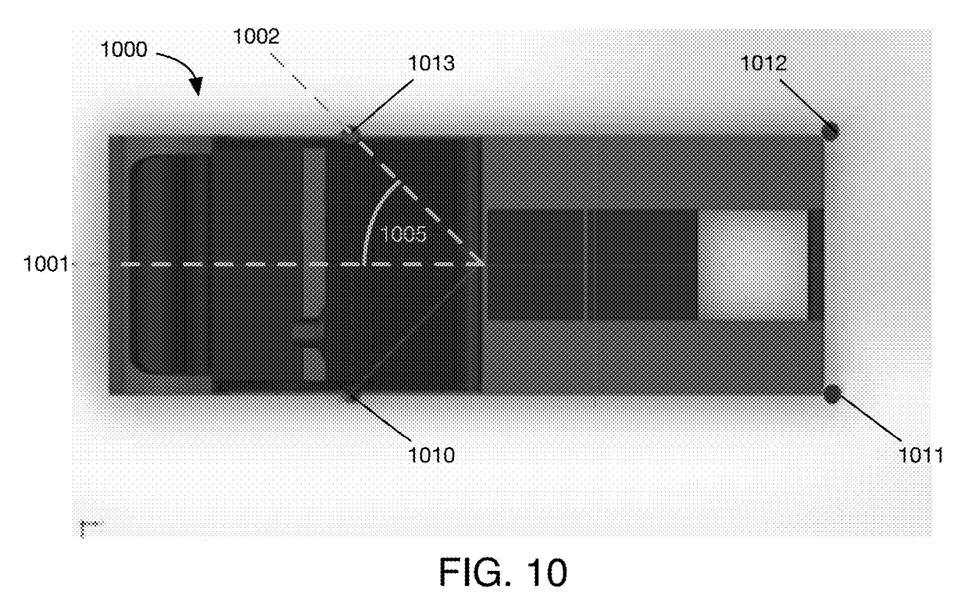
FIG. 10 is top plan view of an AGV with four LIDAR configuration.

In particular, it may be desirable to angle each front LIDAR sensor downwards towards the front of the AGV, and to angle each rear LIDAR sensor downwards towards the rear of the AGV. Additionally, the left LIDAR sensors may also be angled downwards towards the left side of the AGV, and the right LIDAR sensors may also be angled downwards towards the right side of the AGV. Exemplary LIDAR sensor angles are illustrated further in FIGS. 10-11. FIG. 10 illustrates a top plan view of an AGV 1000, with corner-mounted LIDAR sensors 1010, 1011, 1012 and 1013. Front right LIDAR sensor 1013 is angled such that it remains symmetrical across a vertical plane formed through dashed line 1002; in some embodiments, angle 1005 formed between vehicle centerline 1001 and line 1002 may be preferably in a range of 40-50 degrees (and more preferably, 45 degrees), which angles may be particularly effective when using a LIDAR having a field of view of approximately 30 degrees. LIDAR sensors 1010, 1011 and 1012 may be angled similarly by 40-50 degrees (e.g. 45 degrees), outwards from AGV 1000 relative to vehicle centerline 1001.

Figure 11:
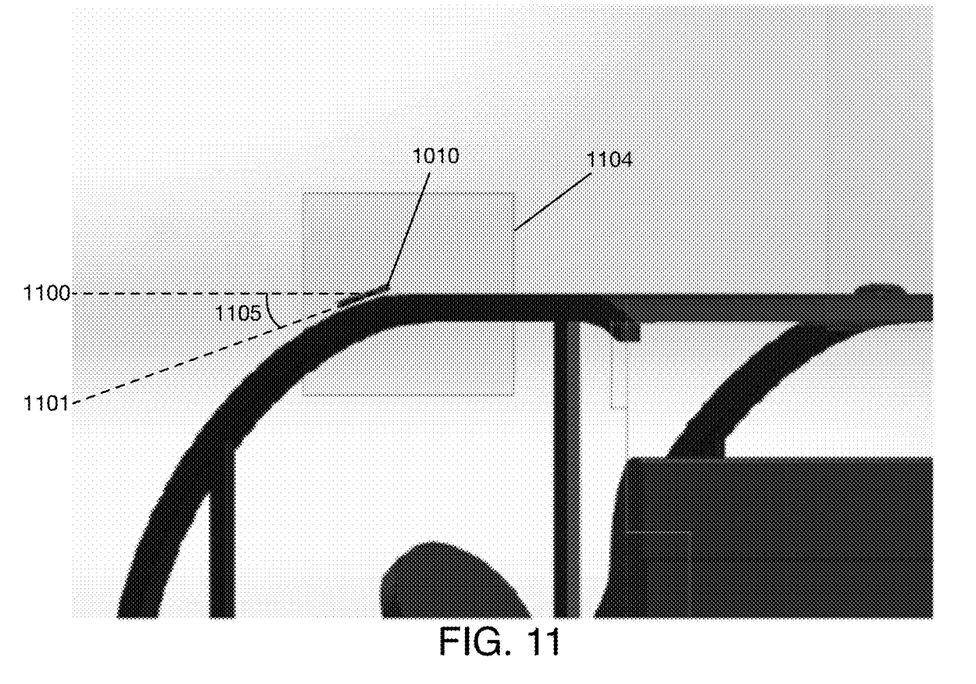
FIG. 11 is a partial cutaway side view of the AGV of FIG. 10.

FIG. 11 is a partial cutaway side elevation of a front right portion of AGV 1000 and LIDAR sensor 1013, showing the angle of declination for LIDAR sensor 1013. In some embodiments, an angle 1105 between horizontal plane 1100 and a plane 1101 bisecting the LIDAR sensor field of view may be specified in a range of 10-30 degrees, and more preferably 12.5 degrees with a LIDAR sensor having a 30 degree field of view. Moreover, with LIDAR sensors having a greater field of view, it may be desirable to increase angle 1105 (i.e. point the LIDAR sensors further downward) in order to improve close-in sensing, with the increased sensor field of view preserving overhead sensing, particularly in combination with opposing sensors which may face upwards across the top of the AGV with light coming from the LIDAR unit on the opposite side of the vehicle. For example, in the example of FIG. 10, LIDAR sensor 1013 angles downwards toward the front right of AGV 1000, potentially limiting the extent to which the field of view of LIDAR 1013 includes regions above the roofline of AGV 1000 (such as trees, street lights, garage entrance thresholds, etc.) However, LIDAR 1011 is angled in an opposite direction, to the left and rear of AGV 1000; thus, the opposite side of LIDAR 1011's field of view is inherently directed upwards, over the roofline of AGV 1000 towards LIDAR 1013. Thus, LIDARs 1013 and 1011 may combinatorially observe low and high areas forward and to the right of AGV 1000, exceeding the field of view in that direction which either LIDAR may possess individually. On the whole, data from LIDARs 1010, 1011, 1012 and 1013 may be combined to provide a comprehensive field of view around all sides of AGV 1000, despite its boxy shape.

While the above description of multiple sensor placement proximate vehicle corners is particularly effective when using LIDAR sensors, it is contemplated and understood that such an arrangement may be effectively utilized with any sensor type having a very large horizontal field of view (e.g. 360 degrees), and with any range of vertical field of view (whether a typical LIDAR field of view of about 30 degrees, or otherwise). Also, the LIDAR configuration described herein may be useful in applications beyond autonomous package delivery, such as mapping, surveying, passenger transportation, and general data collection.

Delivery Operations

Figure 12:
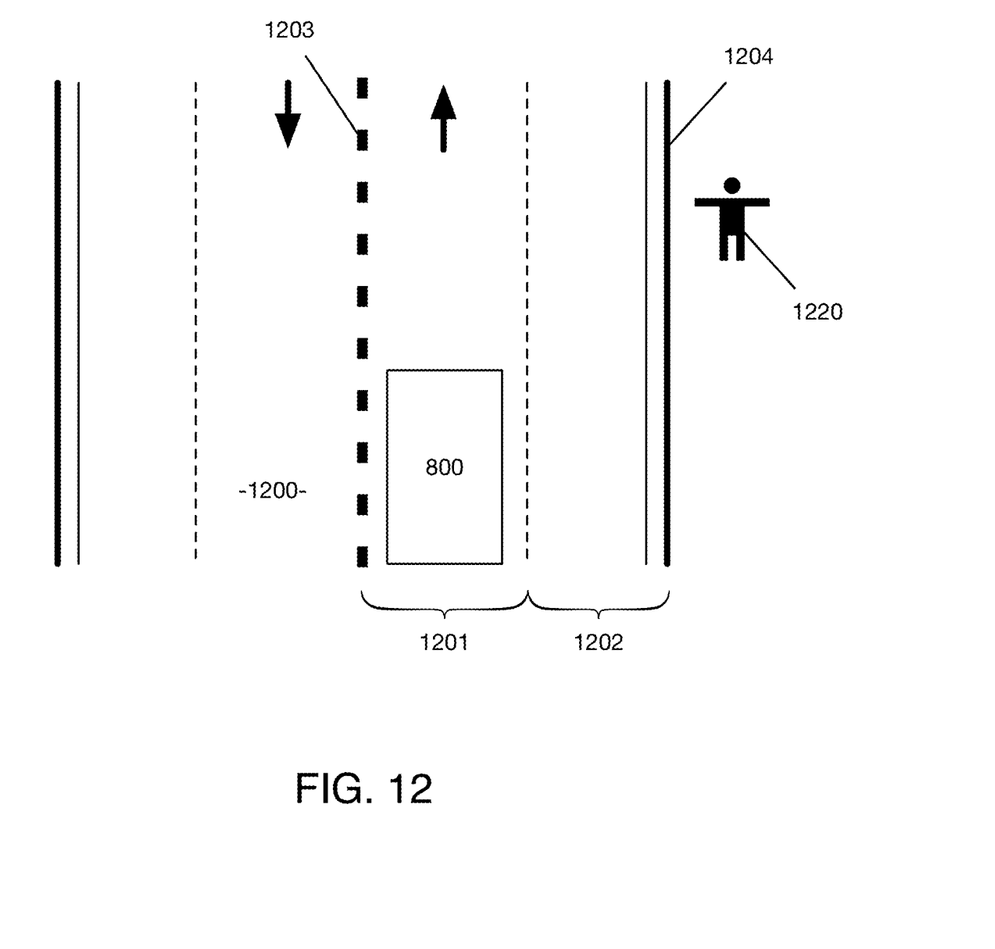
FIGS. 12, 13, 14 and 15 are schematic block diagrams of various AGV delivery scenarios.
Figure 13:
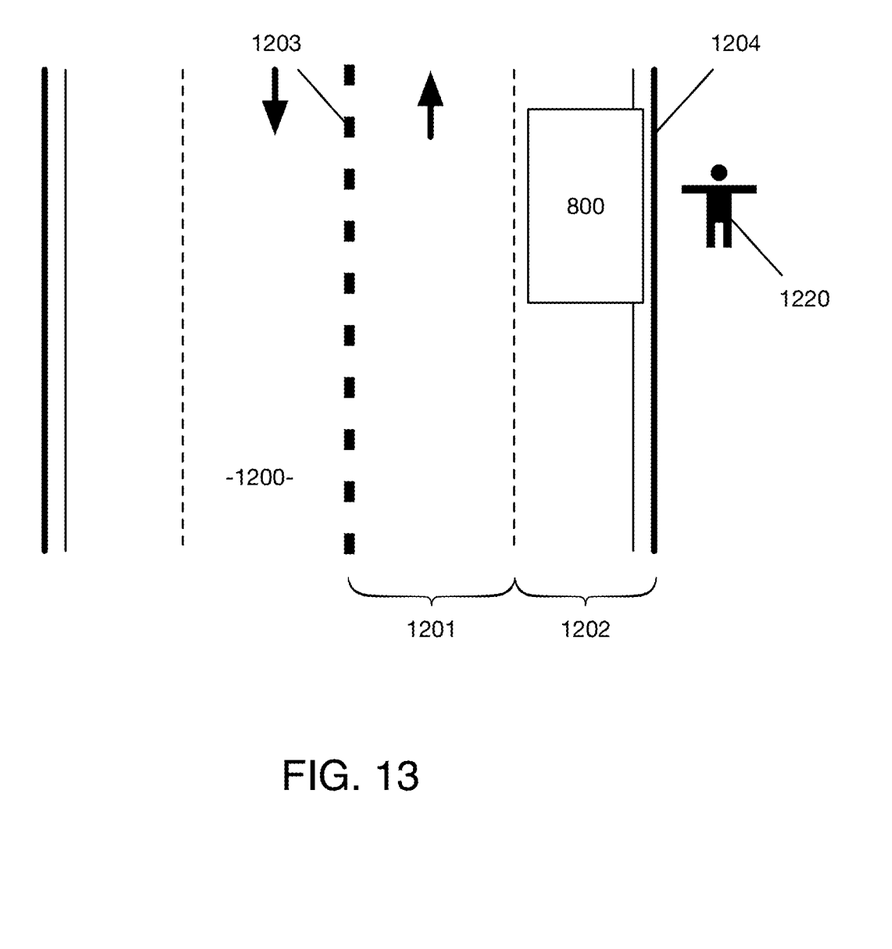

Once loaded, two-sided AGVs such as those described hereinabove may be utilized in a variety of ways to maximize operating efficiency. In some embodiments, fully driverless operation may be utilized for package deliveries. FIGS. 8-9 illustrate an exemplary AGV 800 adapted for fully driverless operation. Package recipients may be notified (e.g. via email, telephone call, SMS, app notification, or the like) when the AGV 800 approaches the recipient's location. FIG. 12 is a schematic block diagram illustrating AGV 800 driving on two-way roadway 1200 in drive lane 1201, approaching a location associated with parcel recipient 1220. In FIG. 13, AGV 800 has pulled over to parking lane 1202 proximate parcel recipient 1220. The recipient 1220 may then approach AGV 800, confirm identity (e.g. by entry of a PIN code at a right side terminal counterpart to AGV terminal 805), and AGV 800 may open one or more right side parcel delivery doors 822 associated with a location in right side parcel storage receptacle 824 in which the recipient's parcel is stored. The AGV 800 may then close the opened door or doors (if the recipient has not already done so), before moving to another parcel recipient's location for further deliveries, or returning to a PRS for charging and/or reloading.

Preferably, the AGV will be provided with physical characteristics and operational capabilities to deliver parcels to recipients from a parcel receptacle facing towards the recipient's location (e.g. towards a recipient's home or office), thereby avoiding requiring a parcel recipient to walk around into a street in order to retrieve a parcel. One or more aspects of AGV operations may be optimized to minimize, or preferably eliminate, instances in which a parcel recipient must cross over to a far side of the AGV to retrieve a parcel. Amongst other reasons, safety may be improved by keeping parcel recipients curbside and accessing portions of the AGV facing away from the street, with the AGV itself potentially protecting the recipient from street activity while accessing parcels.

Figure 14:
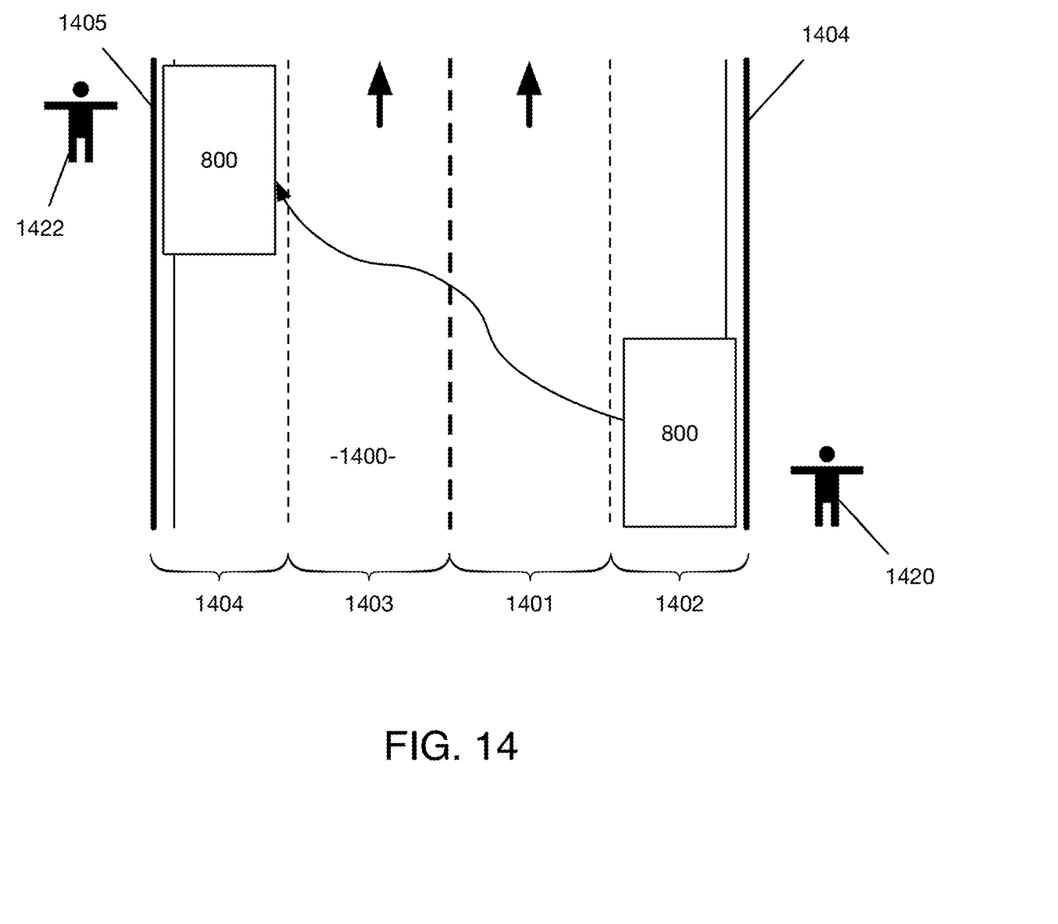

Many roadways are configured so that vehicles drive on one side of a street (e.g., in the United States, along the right hand lane) with traffic traveling in an opposing direction on the opposite side of the street. In such circumstances, it may be desirable to load the AGV such that the majority of parcels are positioned within the package compartment facing towards the near side of the street when traveling in a forward direction. However, some parcel recipients may be located on one-way streets, such as that illustrated in FIG. 14. AGV 800 may readily move between drive lanes 1401 and 1403, and may pull over into parking lanes 1402 or 1404 for deliveries to right side parcel recipient 1420 or left side parcel recipient 1422. In such circumstances, parcels for delivery to recipients 1422 on the left hand side of a one-way street may be loaded into left side parcel receptacle 814, with parcels intended for delivery to right side recipients 1420 being loaded into right side parcel receptacle 824.

Figure 15:
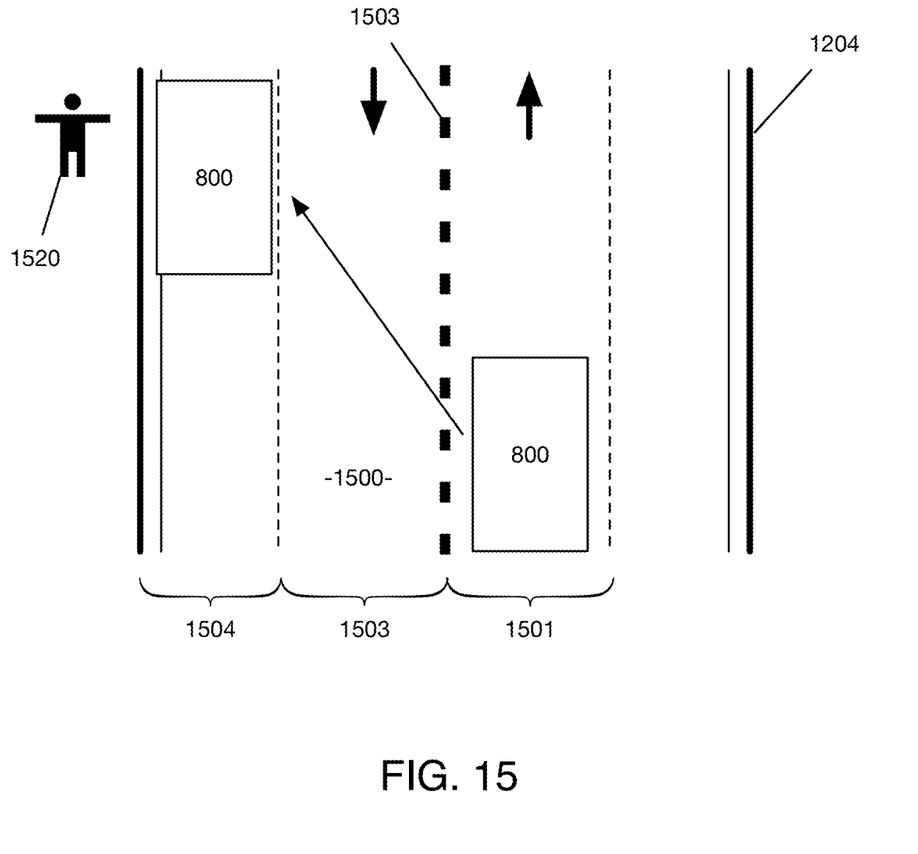

Additionally, in many areas (particularly residential areas or lightly-trafficked streets without physical center dividers), vehicles routinely cross a roadway centerline 1203, such as to pull into and out of driveways or the like. In such environments, it may be desirable to design an AGV to similarly move across a roadway centerline, into a parking area on the opposite side of a roadway, in order to effect delivery to the from the other side of the AGV to the opposite side of the street. FIG. 15 illustrates such an example. Subject to clearance from oncoming traffic, AGV 800 may move from driving lane 1501, across centerline 1503 of two-way roadway 1500, across opposing direction driving lane 1503, into opposing parking lane 1504, in order to effect delivery to parcel recipient 1520 from AGV left side 810. Additionally, unlike human-driven cars, an AGV can be designed and built to drive in reverse as well and as safely as it can drive in a forward direction, providing the AGV with maximum flexibility to safely and efficiently maneuver, particularly within residential or lightly trafficked environments. In order to avoid alarming onlookers during crossover maneuvers or reverse operation, AGV 800 will preferably be designed with an external appearance that is relatively symmetric from front to back, thereby minimizing or avoiding any onlooker concerns about a vehicle facing or driving the "wrong direction" on roadway 1500. Operational and safety components of the AGV may also be symmetric, further facilitating bidirectional operation, such as providing headlight and brake light functionality from either end of the vehicle. The AGV may operate in forward or reverse directions for as long as is required, until a customer or operating requirement dictates a change in direction. After parcel delivery, and subject to clearance from traffic, AGV 800 may then move directly back over into driving lane 1501 to resume transit and deliveries; or, proceed driving in reverse in lane 1503 towards delivery locations in the opposite direction. In this way, AGV 800 may balance parcel deliveries from left and right sides of the AGV without requiring parcel recipients to cross over into a roadway or cross the street entirely, while also enabling parcel deliveries to recipients on both sides of a roadway during a single passage along a given road.

Figure 18:
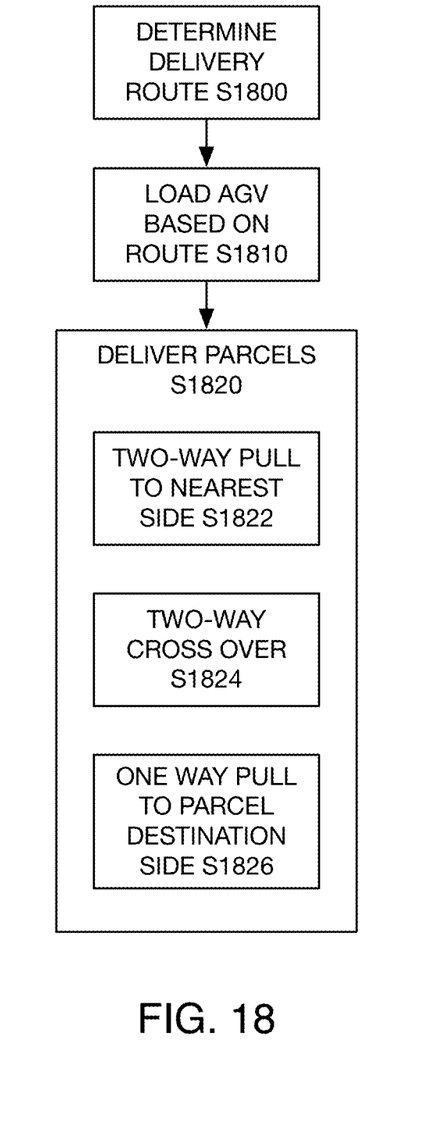
FIG. 18 is a method for package delivery.

FIG. 18 illustrates a delivery method, as described above, using strategic loading of an AGV having parcel receptacle areas on both left and right sides of the vehicle. In step S1800, a delivery route is determined for a set of packages queued for loading into AGV 800. The delivery route will include information concerning planned travel lanes within roadways, as well as the side of a roadway on which each delivery destination sits. The delivery route is determined assuming that the AGV will be able to pull over on either side of a roadway that is one-way, or that has no center median divider, rule or traffic condition prohibiting the AGV from crossing over to either side of the roadway. In step S1810, the AGV is loaded with parcels for delivery. Each parcel is loaded into a side of the AGV nearest the side of a road on the delivery route to which the parcel is to be delivered. In step S1820, AGV travels the route determined in step S1800 and delivers each parcel. In particular, in substep S1822, along a two-way road, the AGV pulls over towards the nearest side of the road for parcels queued for delivery to that side. In substep 51824, on a two-way road without median or other condition prohibiting the AGV from crossing over the roadway centerline, for packages queued for delivery to locations opposite the lane of travel, the AGV crosses the road centerline to the opposite curb for parcel delivery. In substep S1826, when traveling on a one-way road, the AGV pulls to whichever side on which the delivery location resides.

Figures 16A, 16B, 16C:
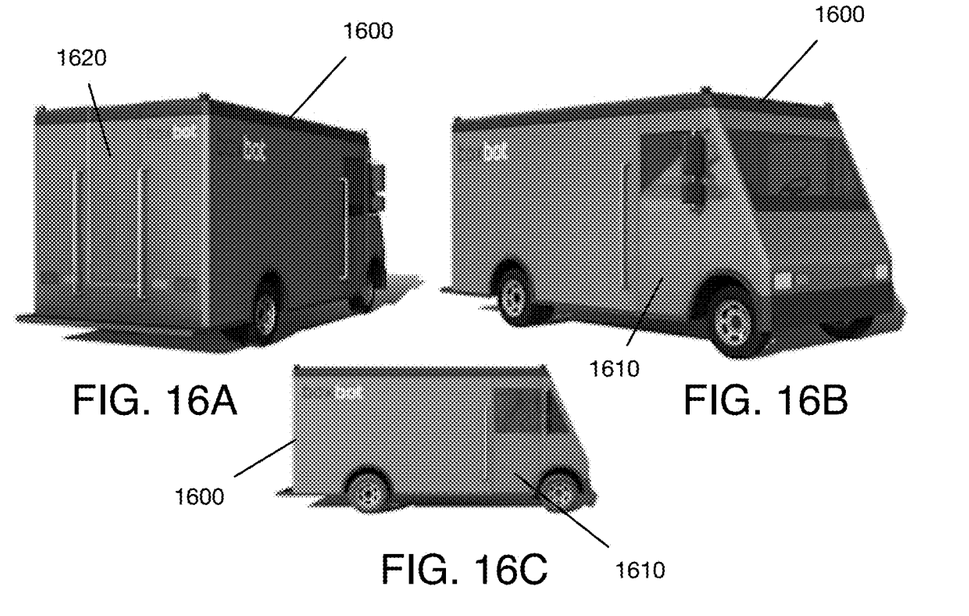
FIGS. 16A, 16B and 16C illustrate various views of an AGV configured for human parcel delivery person assistance.
Figures 17A, 17B, 17C:
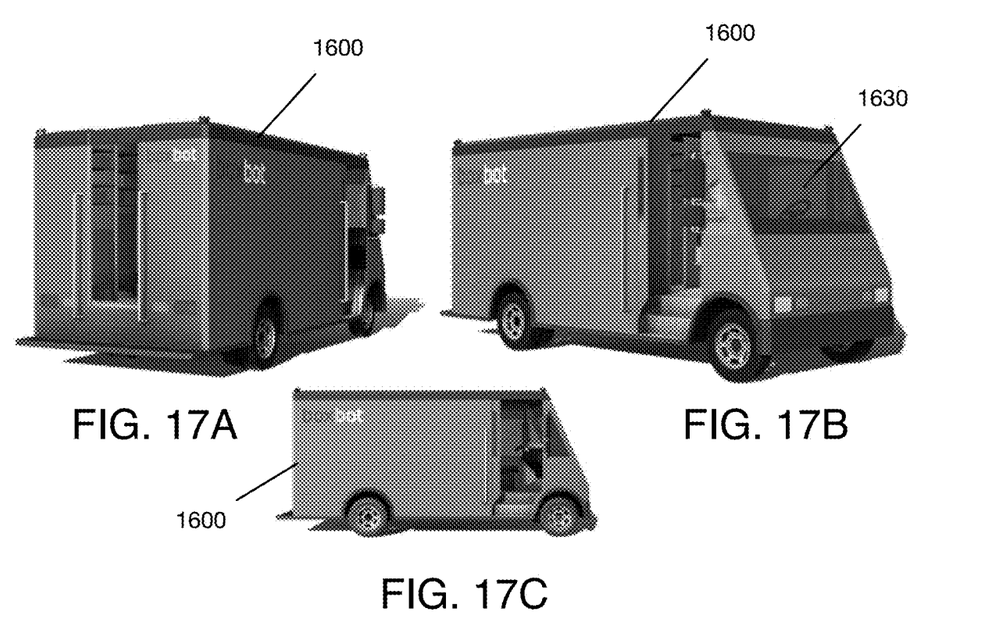
FIGS. 17A, 17B and 17C illustrate various views of an AGV configured for human parcel delivery person assistance.

In other embodiments, an AGV may be combined with a human delivery person in order to effect certain types of deliveries that may better implemented with human involvement. FIG. 16A illustrates a rear perspective view of such an AGV 1600. FIG. 16B illustrates a from perspective view of AGV 1600. FIG. 16C illustrates a side elevation of AGV 1600. In each of FIGS. 16A-C, rear access door 1620 and passenger compartment door 1610 are illustrated as being in a closed position. FIGS. 17A, 17B and 17C illustrate views of AGV 1600 that are analogous to FIGS. 16A, 16B and 16C, respectively, but with rear access door 1620 and passenger compartment door 1610 in open positions. Preferably, rear access door 1620 extends over into the top side of AGV 1600, similarly to rear access door 832 in AGV 800, thereby facilitating loading operations by, e.g., extension of a 2D gantry into the rear of AGV 1600.

In AGV 1600, a parcel delivery person may ride in cabin 1630 during AGV transit. Navigation may be autonomous, allowing the parcel delivery person to rest during transit and focus on parcel delivery tasks. Upon arriving at a parcel delivery destination, the parcel delivery person may retrieve a parcel from parcel storage areas within AGV 1600, and complete delivery, such as via a porch drop of the parcel. AGV 1600 may also be beneficially utilized for deliveries of parcels with a recipient signature is required; as the human delivery driver may verify the intended recipient and obtain a signature confirming receipt. Delivery persons are also helpful in supplementing the functionality of a driverless AGV for business deliveries or deliveries of occupants of buildings where it may be highly inconvenient for parcel recipient to come to the curb to meet the delivery vehicle or be available during a particular delivery window.

Other benefits of the manual assist, drop on porch delivery systems include the ability for a parcel delivery person to meet AGV 1600 in a geographic area associated with parcels loaded into AGV 1600. Thus, for example, parcel delivery workers may avoid commuting to a central facility to meet the delivery vehicle, load the vehicle and then drive to a geographic area associated with the parcels to be delivered, as well as subsequently driving the delivery vehicle back to the central facility. Also, once the AGV is empty or all deliveries have been attempted, it can return to the Hub or PRS without any human assistance. If a delivery person is limited by the number of parcels in their vehicle and not their hours worked, new AGVs can arrive autonomously at the location of the delivery driver; the delivery person may then switch AGV and continue deliveries from the new AGV, while the emptied AGV autonomously returns to the Hub or PRS for reloading. Thus, compared to conventional modes of delivery, much more of a parcel delivery person's time may be utilized for portions of the delivery process that humans are best adapted for, namely, delivery of parcels from a vehicle to the recipient's door.

Automated functionality described herein attributable to the AGV may be implemented by one or more control systems. Such control systems may be implemented, for example, locally within the AGV, by network-connected (e.g. cloud-based) controllers communicating with systems onboard the AGV, or combinations of both. Systems and methods applicable to autonomous vehicles generally, such as may be known in the art, may also be applied to operation of AGVs as described herein.

While certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of any appended claims.

What is claimed is:

1. An autonomous ground vehicle (AGV) for transporting parcels, comprising:
   a first package area comprising a plurality of parcel receptacle areas having externally-exposed doors exposed on a first external side of the AGV enabling access to said parcel receptacle areas by parcel recipients;

a second package area comprising a plurality of parcel receptacle areas having externally-exposed doors exposed on a second external side of the AGV enabling access to said parcel receptacle areas by parcel recipients; and a central channel between the first package area and the second package area, wherein each of the first package area and the second package area are accessible for loading from the central channel;

wherein the first package area and the second package area are each movable between a loading position, in which the first and second package areas are extended outwards from one another relative to a package compartment centerline, and a navigation position, in which the first and second package areas are moved towards one another relative to the loading position.

2. An autonomous ground vehicle (AGV) for transporting parcels, comprising:

a first package area comprising a plurality of parcel receptacle areas having externally-exposed doors exposed on a first external side of the AGV enabling access to said parcel receptacle areas by parcel recipients;

a second package area comprising a plurality of parcel receptacle areas having externally-exposed doors exposed on a second external side of the AGV enabling access to said parcel receptacle areas by parcel recipients;

a central channel between the first package area and the second package area, wherein each of the first package area and the second package area are accessible for loading from the central channel; and a 2D gantry positioned within the central channel for loading and/or unloading of parcels from the first package area and the second package area.

3. The AGV of claim 1, further comprising:

A 2D gantry positioned within the central channel for loading and/or unloading of parcels from the first package area and the second package area when the first and second package areas are in the loading position.

4. An autonomous ground vehicle (AGV) for transporting parcels, comprising:

a first package area comprising a plurality of parcel receptacle areas having externally-exposed doors exposed on a first external side of the AGV enabling access to said parcel receptacle areas by parcel recipients;

a second package area comprising a plurality of parcel receptacle areas having externally-exposed doors exposed on a second external side of the AGV enabling access to said parcel receptacle areas by parcel recipients;

a central channel between the first package area and the second package area, wherein each of the first package area and the second package area are accessible for loading from the central channel; and an access door movable between a closed position and an open position, wherein the open position provides access to the central channel from outside the AGV.

5. The AGV of claim 4, in which the access door extends from a rear surface of the AGV onto a top surface of the AGV; whereby a 2D gantry may be extended into the central channel when the access door is in the open position.

6. A method of loading an autonomous package delivery vehicle comprising:

separating a first package area comprising a plurality of first side parcel receptacle areas, from a second package area comprising a plurality of second side parcel receptacle areas, by moving the first package area and the second package area laterally away from a vehicle centerline to open a central channel between them;

interposing a 2D gantry within the central channel, the 2D gantry transporting parcels into one or more of the first side and/or second side parcel receptacle areas;

removing the 2D gantry from the central channel; and moving the first package area and the second package area inwards toward the vehicle centerline for navigation.

7. The method of claim 6, in which the step of interposing a 2D gantry within the central channel comprises reversing the autonomous package delivery vehicle towards a fixed-location 2D gantry, until a portion of the 2D gantry is positioned within the central channel.

8. The method of claim 7, in which the step of removing the 2D gantry from the central channel comprises the sub step of moving the autonomous package delivery vehicle in a forward direction.

* * * * *